United States Patent [19]

Okano

[11] Patent Number: 4,528,599
[45] Date of Patent: Jul. 9, 1985

[54] FM ANGULAR MODULATION SYSTEM FOR VIDEO SIGNAL RECORDING

[75] Inventor: Takashi Okano, Saitama, Japan

[73] Assignee: Universal Pioneer Corporation, Tokyo, Japan

[21] Appl. No.: 285,686

[22] Filed: Jul. 21, 1981

[30] Foreign Application Priority Data

Jul. 23, 1980 [JP] Japan .................................. 55-100954

[51] Int. Cl.³ ............................................ H04N 9/491
[52] U.S. Cl. ..................... 358/328; 358/310
[58] Field of Search ............... 358/310, 313, 328, 330; 360/11.1

[56] References Cited

U.S. PATENT DOCUMENTS

| | | | |
|---|---|---|---|
| 3,359,365 | 12/1967 | Kihara .................................. | 358/313 |
| 3,968,514 | 7/1976 | Narahara et al. ................ | 358/310 X |
| 4,220,964 | 9/1980 | Yamagiwa et al. ............. | 358/310 X |
| 4,247,865 | 1/1981 | Mastronardi ........................ | 358/312 |

FOREIGN PATENT DOCUMENTS

| | | | |
|---|---|---|---|
| 37716 | 3/1977 | Japan .................................. | 358/310 |
| 30383 | 3/1981 | Japan .................................. | 358/310 |

OTHER PUBLICATIONS

SMPTE, vol. 85, No. 8, Aug. 76; "The Electronic Still Store: A Digital System for the Storage and Display of Still Pictures", Connolly et al.

*Primary Examiner*—Aristotelis M. Psitos
*Attorney, Agent, or Firm*—Sughrue, Mion, Zinn, Macpeak & Seas

[57] ABSTRACT

A method and apparatus for recording a color video signal on a recording medium such as video disk in which effects of crosstalk between adjacent recorded tracks are eliminated and the level and phase of the subcarrier signal are maintained constant. The video signal to be recorded is processed so that the phase of the subcarrier signal is constant from frame to frame of the video signal. The video signal thus processed is recorded utilizing an FM modulation system. Specifically, the video signal is separated into a luminance signal and a subcarrier signal. Subcarrier signals to be recorded on adjacent recording tracks are superposed on the luminance signal after processing of the video signal.

4 Claims, 3 Drawing Figures

FM ANGULAR MODULATION SYSTEM FOR VIDEO SIGNAL RECORDING

BACKGROUND OF THE INVENTION

The present invention relates to color video signal recording systems. More specifically, the invention relates to a color video signal recording system which is suitable for recording a color video signal on a video disc.

In recording a color video signal on a recording medium, namely, a video disc, a so-called "FM modulation system" has commonly been employed in which a color video signal generated according to NTSC color television signal standards is subjected to FM modulation with the synchronization signal peak amplitude corresponding to 7.5 MHz and the white peak to 9.2 MHz. In order to produce still images, a video signal for one television frame is recorded every revolution of the video disc, thus forming video tracks. Accordingly, the recording is such that video tracks corresponding to the vertical and horizontal synchronizing signals are aligned on predetermined radial lines.

In the reproduction of video signals from a disc according to such a recording system, crosstalk tends to occur between adjacent recorded tracks, as a result of which the level and phase of the subcarrier signal vary, and accordingly it is difficult to reproduce color images with a high fidelity.

SUMMARY OF THE INVENTION

Accordingly, an object of the invention is to provide a color video signal recording system in which the above-described variations of the color signal component due to crosstalk between adjacent tracks is eliminated to thereby provide reproduction of color images with high fidelity.

In accordance with this and other objects of the invention, a color video signal recording system is provided in which the recording of a color video signal is carried out according to an FM modulation system after subcarrier signals to be recorded on adjacent recording tracks of the recording medium have been processed so that the subcarrier signals are in phase with each other.

More specifically, the color video signal is processed so that the phase of the subcarrier signals thereof is constant from frame to frame of the video signal. The color video signal is separated into luminance signals and subcarrier signals and the subcarrier signals to be recorded on adjacent recording tracks on the recording medium are superposed on the luminance signals after the video signal has been processed so that the subcarrier signals are in phase with each other.

DESCRIPTION OF THE PREFERRED EMBODIMENTS

Figure 1:
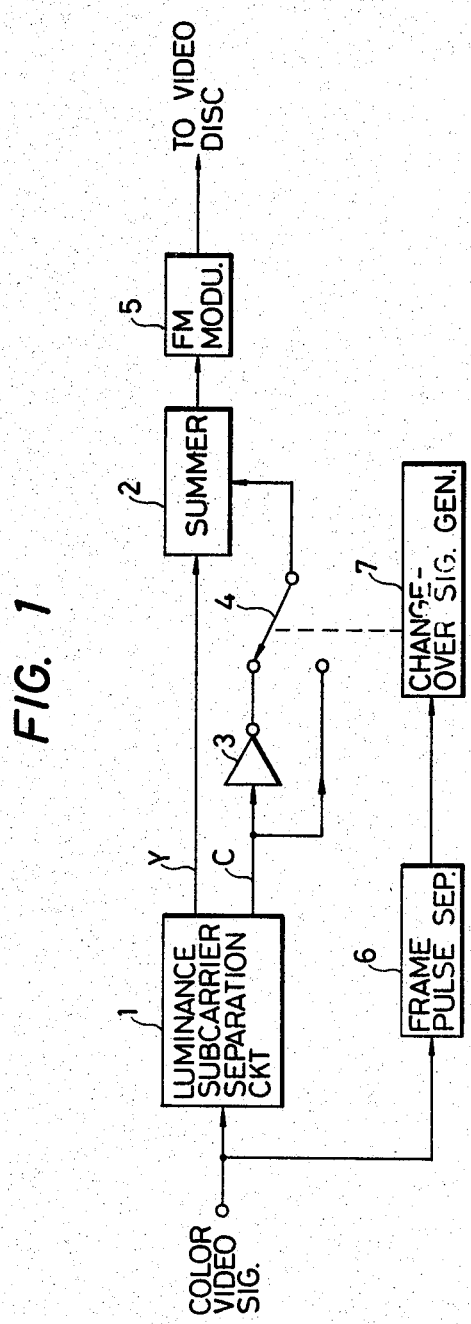
FIGS. 1 and 2 are block diagrams showing two preferred embodiments of the invention.

The invention will be described with reference to the accompanying drawings.

When a color video signal generated according to the NTSC color television system standards is subjected to direct FM modulation, the modulation signal $v_{FM}$ can be represented by the following expression:

$$v_{FM} = \sin(\omega_c t + m \sin \omega_s t), \quad (1)$$

where $\omega_c$ is the angular frequency of the carrier signal indicating the modulation frequency of the luminance signal, $\omega_s$ is the frequency of the subcarrier signal (approximately 3.58 MHz), and m is the modulation index.

In the case where the signal $v_{FM}$ of expression (1) corresponds to a signal component on a main record track which is being reproduced, a recorded signal $v'_{FM}$ on a record track adjacent thereto will be considered. If the horizontal and vertical synchronizing signals are recorded aligned on predetermined radial lines, it can be assumed that the video signals on adjacent tracks are substantially similar. Therefore, it can be assumed that the luminance signal modulation frequency $\omega_c$ changes very little between adjacent tracks. Accordingly, the luminance signal modulation frequency of an adjacent track can be represented by $(\omega_c + \Delta\omega)$.

Since the phase of the subcarrier signal in the NTSC color television system is reversed every frame, the signal of the adjacent track can be represented by the following expression:

$$v'_{FM} = \sin\{(\omega_c + \Delta\omega)t - m \sin(\omega_s t + \phi)\} \quad (2)$$

Therefore, a signal $v_p$ reproduced upon sensing the recorded signal is:

$$v_p = \sin(\omega_c t + m \sin \omega_s t) + k \sin\{\sin(\omega_c + \Delta\omega)t - m \sin(\omega_s t + \phi)\}, \quad (3)$$

where k is a constant related to the amount of crosstalk present, and is in a range of $0 \leq k < 1$.

Expanding the first term on the right side of the expression (3) using the first type of Bessel functions yields:

$$\approx J_0(m) \sin \omega_c t + 2 J_1(m) \cos \omega_c t \cdot \sin \omega_s t. \quad (4)$$

In the expression (4), terms of $J_2(m)$, $J_3(m)$ and higher have been truncated because m is very small.

Similarly, expansion of the second term on the right side of expression (3) yields:

$$\approx k J_0(m) \sin(\omega_c + \Delta\omega)t - 2kJ_1(m) \cos(\omega_c + \Delta\omega)t \cdot \sin(\omega_s t + \phi). \quad (5)$$

In expression (5), terms of $J_3(m)$, $J_4(m)$ and higher have been truncated because m is very small.

Therefore, the value $v_p$ of expression (3) can be represented by the following expression:

$$v_p = J_0(m)\{\sin \omega_c t + k \sin(\omega_c + \Delta\omega)t\} + 2J_1(m)\{\cos \omega_c t \cdot \sin \omega_s t - K \cos(\omega_c + \Delta\omega)t \cdot \sin(\omega_s t + \phi)\} \quad (6)$$

From the first term on the right side of expression (6), the following expression can be obtained:

$$J_0(m) \sqrt{1 + 2k \cos\Delta\omega t} \, \sin(\omega_c t + \psi_1), \quad (7)$$

where $\psi_1$ is $\tan^{-1}\{k \sin \Delta\omega/(1 + k \cos \Delta\omega t)\}$.

If the second term on the right side of expression (6) is arranged, the following expression (8) is obtained:

$$J_1(m)[\sqrt{1 - 2k\cos(\Delta\omega t + \phi)} \cdot \sin\{(\omega_c + \omega_s)t + \psi_2\} - \tag{8}$$

$$\sqrt{1 - 2k\cos(\Delta\omega t - \phi)} \cdot \sin\{(\omega_c - \omega_s)t + \psi_3\}],$$

where $\psi_2 = \tan^{-1}[-k \sin(\Delta\omega t + \phi)/\{1 - k \cos(\Delta\omega t + \phi)\}]$ and $\psi_3 = \tan^{-1}[-k \sin(\Delta\omega t - \phi)/\{1 - k \cos(\Delta\omega t - \phi)\}]$.

Therefore, expression (6) can be rewritten using expression (7) and (8) as follows:

$$v_P = J_0(m) \sqrt{1 + 2k\cos\Delta\omega t} \cdot \sin(\omega_c t + \psi_1) + \tag{9}$$

$$J_1(m) \sqrt{1 - 2k\cos(\Delta\omega t + \phi)} \cdot \sin\{(\omega_c + \omega_s)t + \psi_2\} -$$

$$J_1(m) \sqrt{1 - 2k\cos(\Delta\omega t - \phi)} \cdot \sin\{(\omega_c - \omega_s)t + \psi_3\}.$$

From the expression (9), the level ratio $\alpha$ of a carrier component to a sideband component is:

$$\alpha = \frac{J_1(m)}{J_0(m)} \sqrt{\frac{1 - 2k\cos(\Delta\omega t \pm \phi)}{1 + 2k\cos\Delta\omega t}}. \tag{10}$$

If $\phi = 0$, then expression (10) can be rewritten as:

$$\alpha = \frac{J_1(m)}{J_0(m)} \sqrt{\frac{1 - 2k\cos\Delta\omega t}{1 + 2k\cos\Delta\omega t}}. \tag{11}$$

The level ratio $\alpha$ represents the ratio of the level of a carrier ($\omega_c$) generated by crosstalk from the adjacent track to the level of a subcarrier signal ($\omega_c - \omega_s$), which is a sideband signal. Thus, the ratio $\alpha$ varies with $\Delta\omega t$. The curve 30 in FIG. 3 indicates variations of the level ratio $\alpha$ in the case of $k = 0.032$ (a crosstalk of $= 31$ dB).

On the other hand, if a subcarrier signal to be recorded on the adjacent track is made to agree in phase with a subcarrier signal recorded on the main track, then $\phi$ can be replaced by $(\phi + \pi)$ in the expressions above. In this case, the level ratio $\alpha'$ of the carrier to the sideband signal is:

$$\alpha = \frac{J_1(m)}{J_0(m)} \sqrt{\frac{1 + 2k\cos(\Delta\omega t \pm \phi)}{1 + 2k\cos\Delta\omega t}}. \tag{12}$$

If $\phi = 0$, then expression (12) can be rewritten as follows:

$$\alpha = \frac{J_1(m)}{J_0(m)}. \tag{13}$$

Figure 3:
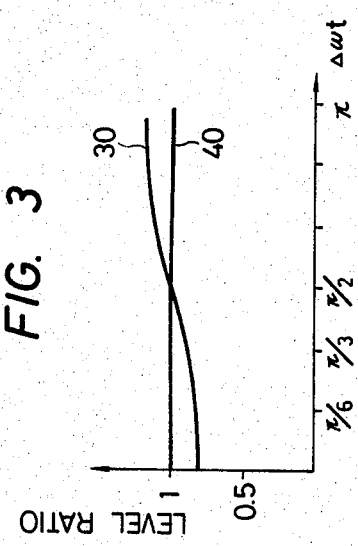
FIG. 3 is a graphical representation for a description of the effects of the invention.

It is apparent from the expression (13) that, if subcarrier signals are recorded on adjacent tracks in such a manner that they are in phase with each other, then the chrominance signal level due to the crosstalk is maintained constant with respect to the carrier signal level, as indicated by a curve 40 in FIG. 3.

Next, the effect of the adjacent track on the subcarrier signal phase will be considered. In this case, expression (9) can be written as:

$$v_P = J_0(m) \sqrt{1 + 2k\cos\Delta\omega t} \cdot \sin(\omega_c t + \psi_1) + \tag{14}$$

$$J_1(m) \sqrt{1 - 2k\cos(\Delta\omega t + \phi)} \cdot \sin\{(\omega_c + \omega_s)t + \psi_1 + (\psi_2 - \psi_1)\} -$$

$$J_1(m) \sqrt{1 - 2k\cos(\Delta\omega t + \phi)} \cdot \sin\{(\omega_c - \omega_s)t + \psi_1 + (\psi_3 - \psi_1)\}.$$

With $\phi = 0$, $\psi_2 = \psi_3$. Therefore, the phase variation $\Delta\psi$ of the sideband component is:

$$\Delta\psi = \psi_2 - \psi_1 = \psi_3 - \psi_1 \tag{15}$$

$$= \tan^{-1} \frac{-k \sin\Delta\omega t}{1 - k\cos\Delta\omega t} - \tan^{-1} \frac{k \sin\Delta\omega t}{1 + k\cos\Delta\omega t}.$$

Thus, the color signal phase is varied by crosstalk.

However, if the subcarrier signals are recorded on adjacent tracks in such a manner that they are in phase with each other, $\phi = \pi$. Therefore, $\psi_1 = \psi_2 = \psi_3$, and accordingly $\Delta\psi = 0$. Thus, in this case, no subcarrier signal phase variation is caused by crosstalk.

FIG. 1 is a block diagram of a preferred embodiment of a color video playback circuit of the invention. A color video signal generated according to the NTSC color television system standard is applied to a separation circuit 1 where the luminance signal and the subcarrier signal are separated therefrom. The luminance signal Y is applied to analog signal summer circuit 2 directly. The subcarrier signal C is applied through an inverter 3 to one contact of a change-over switch 4 and applied directly to the other contact of the switch 4. A switch change-over signal output is superposed on the luminance signal Y in the summer circuit 2, and the resultant signal is subjected to direct FM modulation by an FM modulator 5 and then recorded on a recording disc. A frame pulse separation circuit 6 is provided for control of the switch 4. That is, the circuit 6 operates to separate a frame pulse signal from the video signal. Using the frame pulse signal, a change-over signal generating circuit 7 is operated to perform change-over of the switch for every television frame.

Thus, with the invention, for a video disc in which a video signal for one television frame is recorded every disc revolution and the phase of a subcarrier signal is reversed between adjacent television frames, the phase and level of the subcarrier signal in the reproduced signal are not affected by crosstalk, and a color image is reproduced with a high fidelity.

Figure 2:
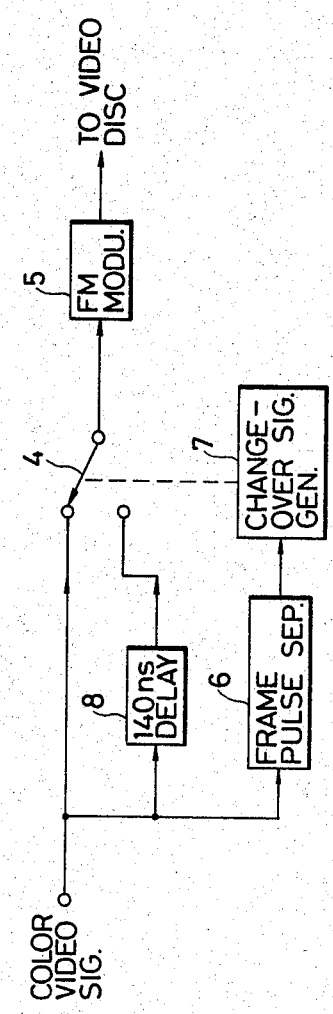

FIG. 2 is a block diagram showing another embodiment of a color video playback circuit of the invention. In this embodiment, the video signal is alternately shifted in time in positive and negative directions every television frame so that the subcarrier signals are made to be in phase with each other.

A color video signal generated according to the NTSC color television system standards is applied directly to one contact of a switch 4 and through a delay circuit 8 to the other contact of the switch 4. The delay circuit 8 operates to selectively delay the video signal. The output of the switch 4 is applied to an FM modulator 5. The switch 4 is controlled by the output of a change-over control signal generating circuit 7 which operates in response to the output frame pulse of a frame pulse separation circuit 6. The delay time of the delay circuit 8 is selected to be half (about 140 ns) of the period ($1/f_s$) at the frequency $f_s$ ($\approx 3.58$ MHz) of the subcarrier signal. Thus, by operating the switch 4, subcarrier in-phase signals are obtained for each television frame.

Moreover, in reproduction of the signal thus recorded, a color video signal according to the NTSC color television system standards is obtained by completely reversing the procedure of the recording method described with reference to FIG. 1 or 2.

Furthermore, in a case of using such a recording medium in accordance with the invention, it is necessary for a reproducing apparatus to normalize the phase of the reproduced subcarrier signal in conformity to the color television standards. Such a reproducing apparatus for normalizing the phase of the reproduced subcarrier signal can be constructed with the same components used for recording in accordance with the invention. In other words, the embodiments of FIGS. 1 and 2 are also applicable to a reproducing apparatus.

In a reproducing apparatus, as the extracted signals from the recording medium are modulated, it is necessary to provide an FM demodulator before the input for producing a color video signal. The output of the summer 2 (FIG. 1) or switch 4 (FIG. 2) provides a normalized video signal. Modulator 5 is unnecessary in a reproducing apparatus.

As is apparent from the above description, according to the invention, the effect of crosstalk between adjacent tracks of the subcarrier signal is eliminated. Therefore, a color television image can be reproduced with a high fidelity and the signal recording density can be greatly increased.

While the invention has been described with reference to the case where a video disc is employed as the recording medium, it is evident that, under the same conditions, the technical concept of the invention is applicable to a video tape recording medium, and the FM modulation system as used in the invention can be replaced by a phase modulation system.

What is claimed is:

1. An apparatus for recording and reproducing a color video signal according to an angular modulation system, comprising:

a delay circuit having an output coupled to receive a color video signal for recording, said color video signal having a plurality of different frames, said delay circuit producing a delay substantially equal to one-half of a period of a subcarrier of said color video signal;

a switch having a first input contact coupled to receive said color video signal and a second input contact coupled to an output of said delay circuit;

a frame pulse separating circuit operating in response to said color video signal for producing frame pulses between frames of said color video signal;

changeover signal generating switch means for operating said switch to alternately couple said output of said switch to said first and second input contacts in response to said frame pulse;

an FM modulator having an input coupled to an output of said switch;

recording means for recording an output of said FM modulator on a recording medium; and reproducing means for reproducing video signals from said recording medium, said reproducing means including means for alternately delaying said color video signal during every other frame so that subcarrier signals of successive reproduced frames are out-of-phase with respect to one another.

2. An apparatus for recording and reproducing a color video signal according to an angular modulation system, comprising:

recording means for reproducing a plurality of successive frames of a video signal on a recording medium with the subcarrier signals of successive ones of said frames having like phases;

reproducing means for reproducing successive frames from said recording medium with subcarrier signals of like phase;

a delay circuit having an input coupled to receive an output of said reproducing means, said color video signal having a plurality of different frames, said delay circuit producing a delay substantially equal to one-half of a period of a subcarrier of said color video signal;

a switch having a first input contact coupled to receive said color video signal and a second input contact coupled to an output of said delay circuit.

a frame pulse separating circuit operating in response to said color video signal for producing frame pulses between frames of said color video signal; and changeover signal generating switch means for operating said switch to alternately couple said output of said switch to said first and second input contacts in response to said frame pulses, whereby the subcarrier signals of successive frames of said color video signal provided at said output of said switch are out-of-phase with respect to one another.

3. A method for recording and reproducing a color video signal, said color video signal having a plurality of different frames, according to an angular modulation system, said method being of the type wherein consecutive frames of said color video signal are recorded on adjacent tracks of said recording medium, so that the video tracks corresponding to the vertical and horizontal synchronizing signals are aligned to predetermined lines, said method comprising the steps of:

processing said color video signal by delaying said color video signal only during every other frame so that the subcarrier signals on adjacent recording tracks on said recording medium have like phase;

recording the processed color video signal on said recording medium;

reproducing the processed color video signal from said recording medium; and reprocessing the reproduced signal by delaying said color video signal only during every other frame so that the subcarrier signals of frames reproduced from adjacent recording tracks are out-of-phase with respect to one another.

4. The recording and reproducing method as claimed in claim 3, wherein said color video signal in each of said processing and reprocessing steps is delayed for a period of time equal to a half of the period of said subcarrier signal at the frequency of said subcarrier signal.

* * * * *